United States Patent
Hitchcock et al.

(10) Patent No.: US 12,054,106 B2
(45) Date of Patent: Aug. 6, 2024

(54) HIGH VOLTAGE WIRE HARNESS HAVING AN INLINE DISCONNECT

(71) Applicant: TE Connectivity Services GmbH, Schaffhausen (CH)

(72) Inventors: Matthew Bryan Hitchcock, Hershey, PA (US); Nathan Philip Myer, Lancaster, PA (US); Clara Rhodes, Winston Salem, NC (US); Aaron James de Chazal, Rochester, MI (US); Kevin John Peterson, Kernersville, NC (US)

(73) Assignee: TE Connectivity Solutions GmbH (CH)

( * ) Notice: Subject to any disclaimer, the term of this patent is extended or adjusted under 35 U.S.C. 154(b) by 411 days.

(21) Appl. No.: 17/547,537

(22) Filed: Dec. 10, 2021

(65) Prior Publication Data
US 2023/0182659 A1   Jun. 15, 2023

(51) Int. Cl.
*B60R 16/02* (2006.01)
*B60L 53/16* (2019.01)
*H01R 4/34* (2006.01)

(52) U.S. Cl.
CPC .......... *B60R 16/0215* (2013.01); *B60L 53/16* (2019.02); *H01R 4/34* (2013.01)

(58) Field of Classification Search
CPC ....... B60R 16/0215; B60L 53/16; H01R 4/34; H02G 15/013; H02G 15/113; Y02T 10/70; Y02T 10/7072; Y02T 90/14
See application file for complete search history.

(56) References Cited

U.S. PATENT DOCUMENTS

| 8,257,101 | B2* | 9/2012 | Ichio | H01R 13/4367 |
| | | | | 439/559 |
| 10,644,447 | B2* | 5/2020 | Nishio | H01R 24/20 |
| 10,658,802 | B2* | 5/2020 | Schreiber | H01R 24/28 |
| 2004/0266270 | A1* | 12/2004 | Miyazaki | H01R 4/46 |
| | | | | 439/660 |
| 2023/0039799 | A1* | 2/2023 | Kito | H01B 13/01254 |
| 2023/0059653 | A1* | 2/2023 | Hitchcock | B60L 53/16 |

* cited by examiner

*Primary Examiner* — Travis S Chambers

(57) ABSTRACT

A wire harness for a charging inlet of a vehicle includes first and second high voltage wires having first and second conductors. An inline disconnect electrically connects the first and second conductors and is configured to allow the conductors to be disconnected. The inline disconnect includes a housing having a central cavity, a first chamber at a first end that receives the first high voltage wire, and a second chamber open to the central cavity at a second end that receives the second high voltage wire. First and second disconnect contacts terminated to the conductors are received in the central cavity. A connecting element couples the first and second disconnect contacts and is removable from the disconnect contacts to allow disconnection of the first and second disconnect contacts to electrically separate the first and second high voltage wires.

20 Claims, 15 Drawing Sheets

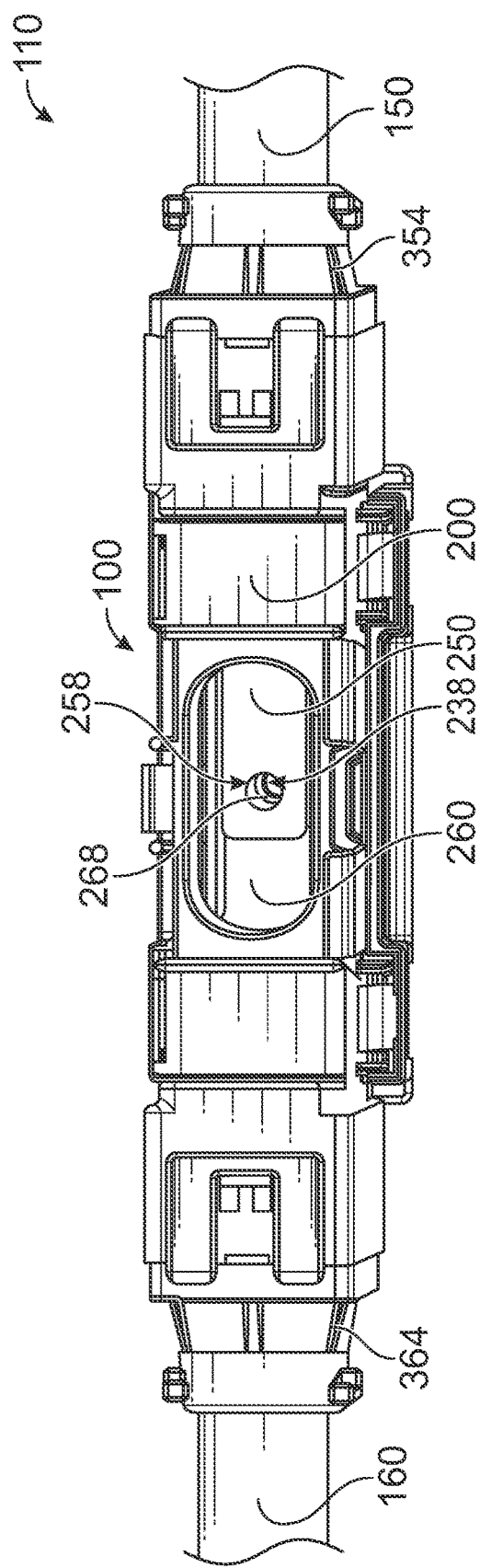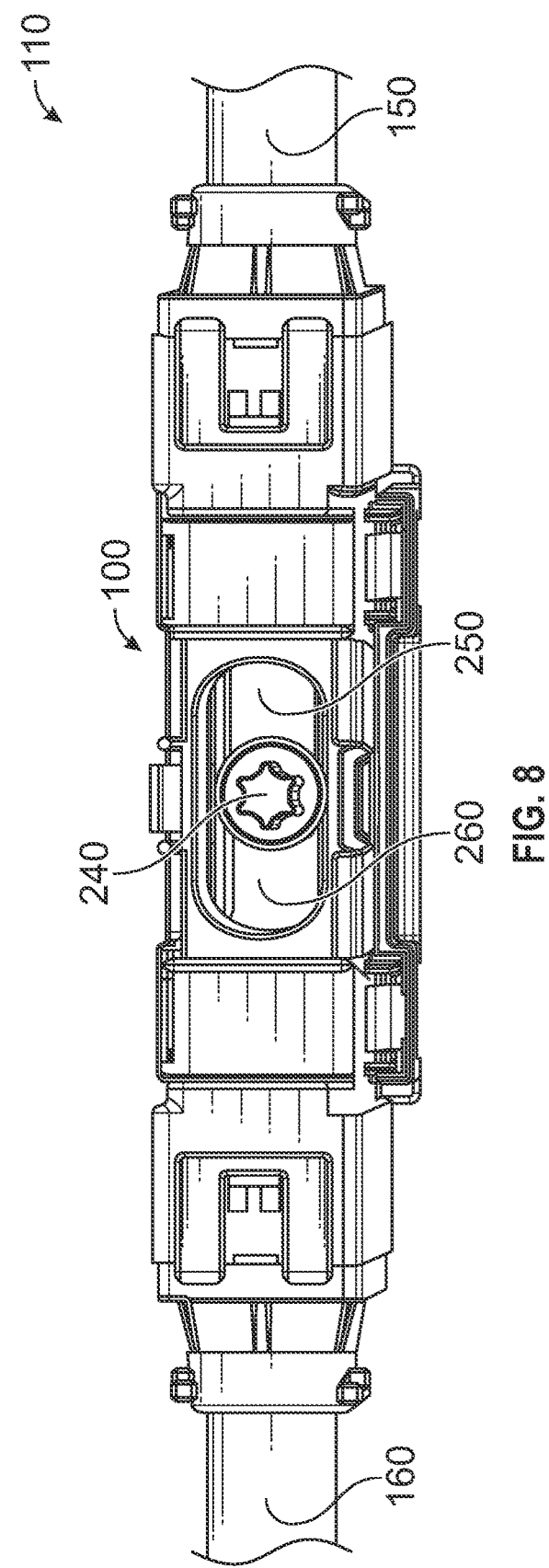
FIG. 7
FIG. 8

HIGH VOLTAGE WIRE HARNESS HAVING AN INLINE DISCONNECT

BACKGROUND OF THE INVENTION

The subject matter herein relates generally to high voltage electrical systems.

Wire harnesses are used to electrically connect various components of the system. For example, in an electric vehicle or a hybrid electric vehicle, a wire harness may be used to electrically connect the battery with other components of the vehicle, such as the battery distribution unit or the charging inlet. The wires of the wire harness are routed through the vehicle. Routing of the wires may be difficult, such as due to space constraints and minimum wire bending requirements. Furthermore, through the life of the vehicle, one or more components of the system may need to be replaced, which may require removal of the wire harness. Removal of the wire harness, particularly after assembly of other components and systems of the vehicle, may be difficult and may require removal of other components of the vehicle to access the wire harness for removal which is a time consuming and costly repair. Additionally, repair or replacement of one or more components of the wire harness may require replacement of the entire wire harness, which adds cost to the repair.

A need remains for a wire harness that may be removed and replaced in a cost effective and reliable manner.

BRIEF DESCRIPTION OF THE INVENTION

In one embodiment, a wire harness for a charging inlet of a vehicle is provided and includes a first high voltage wire that has a first conductor. A second high voltage wire has a second conductor and an inline disconnect configured to electrically connect the first and second conductors and configured to allow the first and second conductors to be disconnected from each other. The inline disconnect is provided and includes a housing having a central cavity. The housing has a first end and a second end. The housing has a first chamber open to the central cavity at the first end. The first chamber receives the first high voltage wire. The housing has a second chamber open to the central cavity at the second end. The second chamber receives the second high voltage wire. A wire harness for a charging inlet of a vehicle includes a first disconnect contact terminated to an end of the first conductor. The first disconnect contact is received in the central cavity. A wire harness for a charging inlet of a vehicle includes a second disconnect contact terminated to an end of the second conductor. The second disconnect contact is received in the central cavity. A wire harness for a charging inlet of a vehicle includes a connecting element coupling the first and second disconnect contacts. The connecting element is removable from at least one of the first disconnect contact or the second disconnect contact to allow disconnection of the first and second disconnect contacts to electrically separate the first and second high voltage wires.

In another embodiment, a wire harness for a charging inlet of a vehicle is provided and includes a high voltage wire extending between a first end and a second end. The high voltage wire has a conductor. A wire harness for a charging inlet of a vehicle includes a charging terminal including a charging pin and a terminating end opposite the charging pin. The charging pin is configured to be electrically connected to a charging device. The terminating end is terminated to the first end of the high voltage wire. The charging terminal is configured to be loaded into a charging inlet housing of the charging inlet. A wire harness for a charging inlet of a vehicle includes a disconnect contact including a terminating end and a mating tab at a mating end. The terminating end of the disconnect contact is terminated to the conductor at the second end of the high voltage wire. The mating tab has a separable mating interface configured to interface with a mating disconnect contact associated with a high voltage battery wire electrically connected to a battery of the vehicle.

In a further embodiment a charging inlet for charging a battery of a vehicle is provided and includes a charging inlet housing including a terminal channel at a front of the charging inlet housing configured to receive a charging device. The charging inlet housing includes a rear chamber at a rear of the charging inlet housing. A charging inlet for charging a battery of a vehicle includes a charging terminal received in the charging inlet housing. The charging terminal includes a charging pin extending into the terminal channel to mate with the charging device. The charging terminal includes a terminating end in the rear chamber. A charging inlet for charging a battery of a vehicle includes a wire harness coupled to the charging terminal. The wire harness includes a high voltage wire extending between a first end and a second end. The high voltage wire has a conductor. The conductor is terminated to the terminating end of the charging terminal at the first end. The wire harness includes a disconnect contact including a terminating end and a mating tab at a mating end. The terminating end of the disconnect contact is terminated to the conductor at the second end of the high voltage wire. The mating tab has a separable mating interface configured to interface with a mating disconnect contact associated with a high voltage battery wire electrically connected to a battery of the vehicle

BRIEF DESCRIPTION OF THE DRAWINGS

FIG. 7 is a top perspective view of a portion of the wire harness and the in-line disconnect in accordance with an exemplary embodiment.

FIG. 8 is a top perspective view of a portion of the wire harness and the in-line disconnect in accordance with an exemplary embodiment.

DETAILED DESCRIPTION OF THE INVENTION

Figure 1:
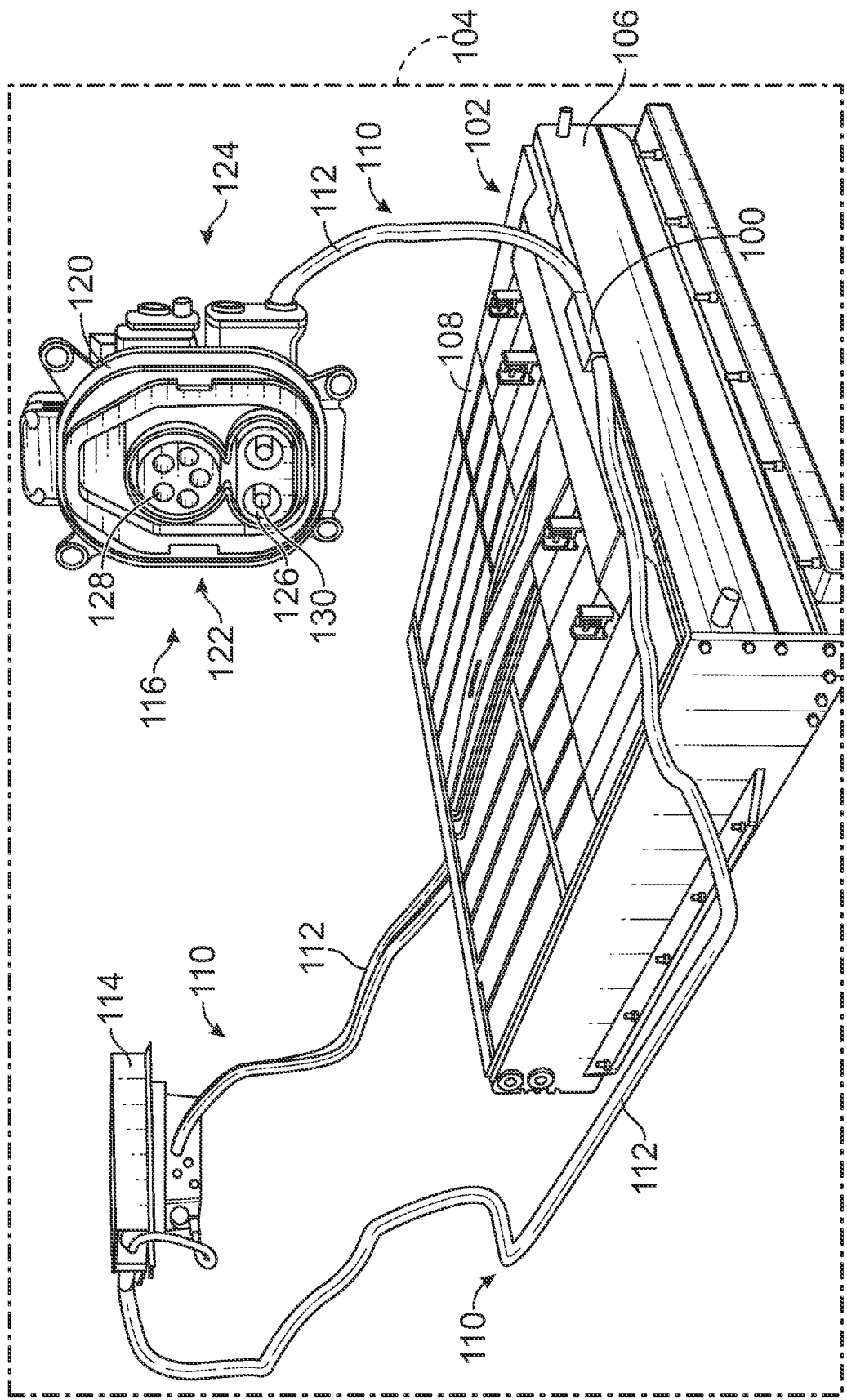
FIG. 1 illustrates an in-line disconnect in accordance with an exemplary embodiment for use in a battery system of a vehicle.

FIG. 1 illustrates an in-line disconnect 100 in accordance with an exemplary embodiment for use in a battery system 102 of a vehicle 104. The battery system 102 includes a battery pack 106 having a plurality of batteries 108 used for operating the vehicle 104. In various embodiments, the vehicle 104 may be an electric vehicle or a hybrid electric vehicle. The battery system 102 includes a wire harness 110 having a plurality of wires 112 used to electrically connect the batteries 108 with various components, such as a battery distribution unit 114 and a charging inlet 116 used to charge the batteries 108. The wires 112 may be high voltage wires configured to carry 600 Volts or more.

In an exemplary embodiment, the in-line disconnect 100 allows disconnection of one or more wires 112 of the wire harness 110, such as for repair or replacement of various components without the need to remove the entire wire harness 110. For example, the in-line disconnect 100 may be located proximate to the charging inlet 116 to allow repair or replacement of the charging inlet 116 without removing the entire wire harness 110. As a non-limiting example, the in-line disconnect 100 may be located proximate to the charging inlet 116 such that removal of the charging inlet 116 and associated wires 112 removes less than 10% of the overall lengths of the wires 112 of the wire harness 110 leaving greater than 90% of the overall lengths of the wires 112 assembled within the vehicle 104 when the charging inlet 116 is removed. The in-line disconnect 100 divides the wire harness 110 into a plurality of wire harnesses that may be separately assembled to the vehicle 104 allowing removal of sections of the wire harness 110 for repair or replacement. Optionally, multiple in-line disconnects 100 may be used within the system, such as proximate to other components, such as the battery distribution unit 114 and/or the battery pack 106.

Figure 2:
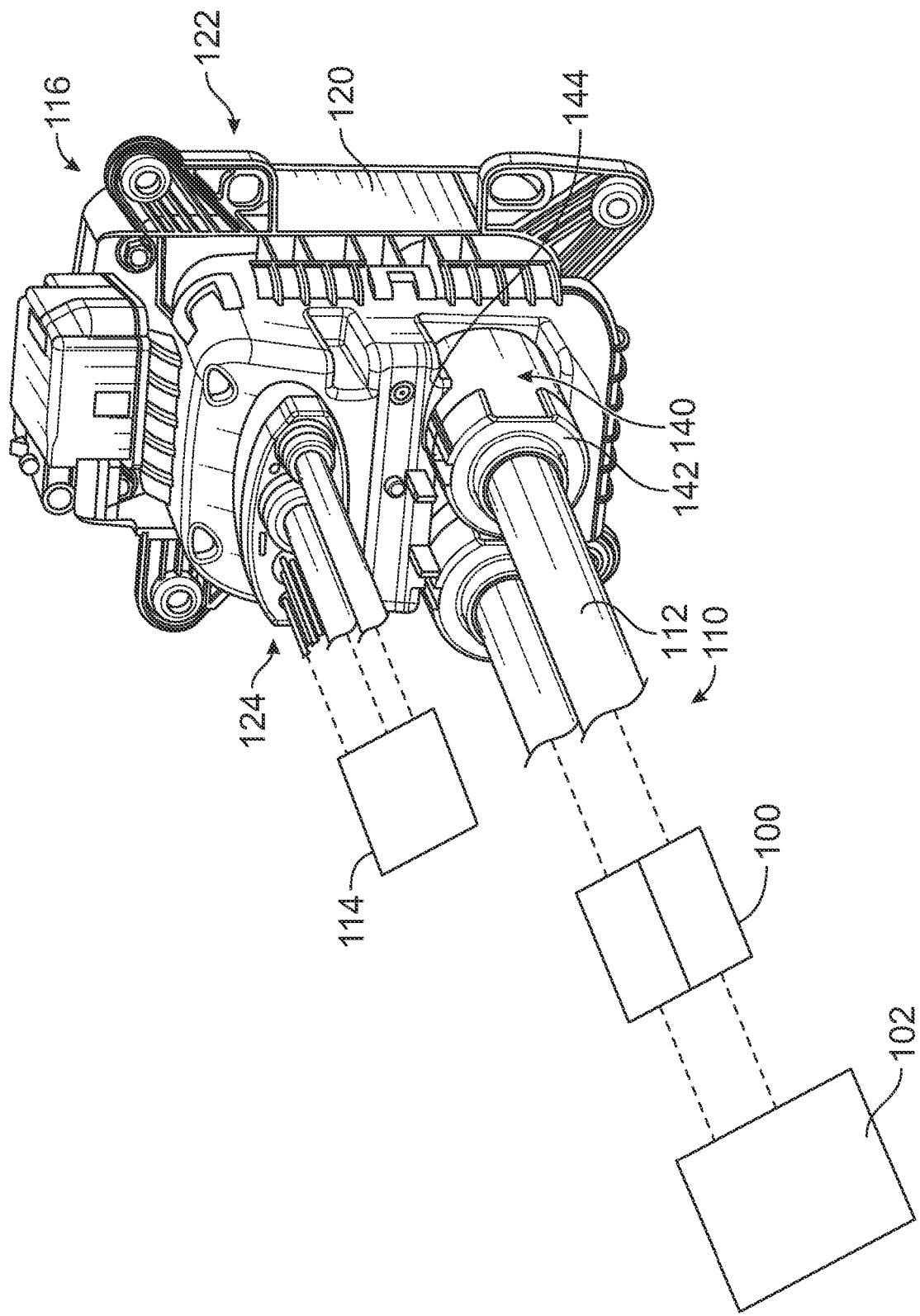
FIG. 2 illustrates the charging inlet and a portion of the wire harness in an exemplary embodiment.
Figure 3:
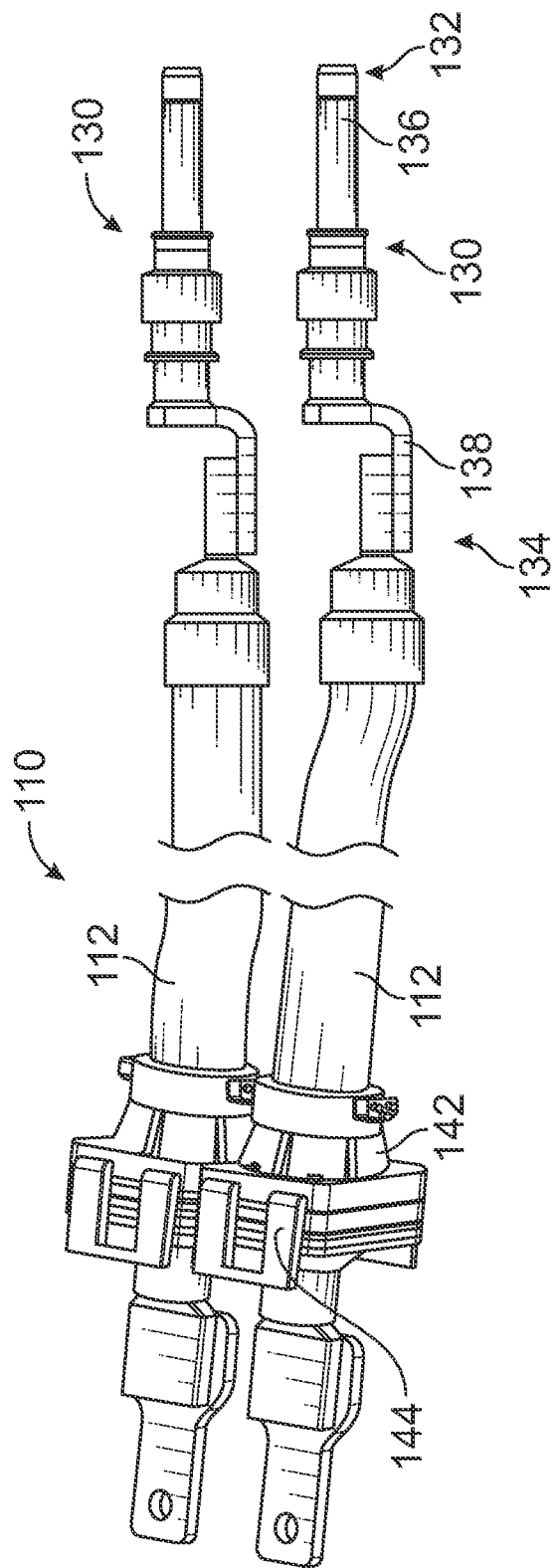
FIG. 3, which illustrates a portion of the charging inlet and a portion of the wire harness, the wires of the wire harness extend from a rear of the charging inlet in an exemplary embodiment.

With additional reference to FIGS. 2, which illustrates the charging inlet 116 and a portion of the wire harness 110, and FIG. 3, which illustrates a portion of the charging inlet 116 and a portion of the wire harness 110, the wires 112 of the wire harness 110 extend from a rear of the charging inlet 116. The in-line disconnect 100 is located downstream of the charging inlet 116 between the charging inlet 116 and the battery 108.

The charging inlet 116 includes a charging inlet housing 120 having a front 122 (FIG. 1) and a rear 124 (FIG. 2). The front 122 of the charging inlet housing 120 defines a mating interface for a charging device, such as a charging plug. The charging inlet housing 120 includes a plurality of terminal channels 126 open at the front 122 to receive the charging device. The charging inlet housing 120 holds the terminals 128 (FIG. 1) in the terminal channels 126. For example, the terminals 128 may include high voltage terminals, low-voltage terminals, grounding terminals, proximity sensors, or other types of terminals. The terminals 128 may be electrically connected to corresponding wires 112 extending from the rear 124 of the charging inlet housing 120.

FIG. 3 illustrates a pair of the terminals 128 as high voltage charging terminals 130. Each charging terminal 130 includes a mating end 132 and a terminating end 134 opposite the mating end 132. The charging terminal 130 includes a charging pin 136 at the mating end 132. The charging pin 136 is configured to be located in the corresponding terminal channel 126 (FIG. 1) for mating with the charging device. The terminating end 134 extends to the rear 124 of the charging inlet housing 120. In an exemplary embodiment, the charging terminal 130 includes a weld pad 138 at the terminating end 134. The conductor of the wire 112 is welded directly to the weld pad 138 of the charging terminal 130. Other types of terminations may be made in alternative embodiments. For example, the terminating end 134 may include a barrel that receives the end of the wire 112 for crimping a bore welding to the wire 112. Other types of terminals may be used in alternative embodiments.

The charging terminals 130 are received in the charging inlet housing 120. The wires 112 extend from the rear 124 of the charging inlet housing 120. The terminating ends 134 of the charging terminals 130 are located in a rear chamber 140 at the rear 124 of the housing 120 for electrical connection with the corresponding wire 112. In an exemplary embodiment, the wire harness 110 includes one or more wire couplers 142 used to couple the wires 112 to the charging inlet housing 120. The wire couplers 142 include securing features 144 coupled to the charging inlet housing 120. The securing features 144 may be latches, clips, fasteners or other types of securing features. In various embodiments, the wire couplers 142 include wire seals (not shown) configured to be sealed to the wires 112 and sealed to the charging inlet housing 120. The wire couplers 142 may be removed or released from the charging inlet housing 120 to allow removal of the charging terminals 130 and the wire harness 110 from the charging inlet housing 120. As such, the wire harness 110 may be removed and replaced or the charging inlet housing 120 may be removed from the vehicle and replaced and then the wire harness 110, with the charging terminals 130, may be coupled to the replaced charging inlet housing 120.

Figure 4:
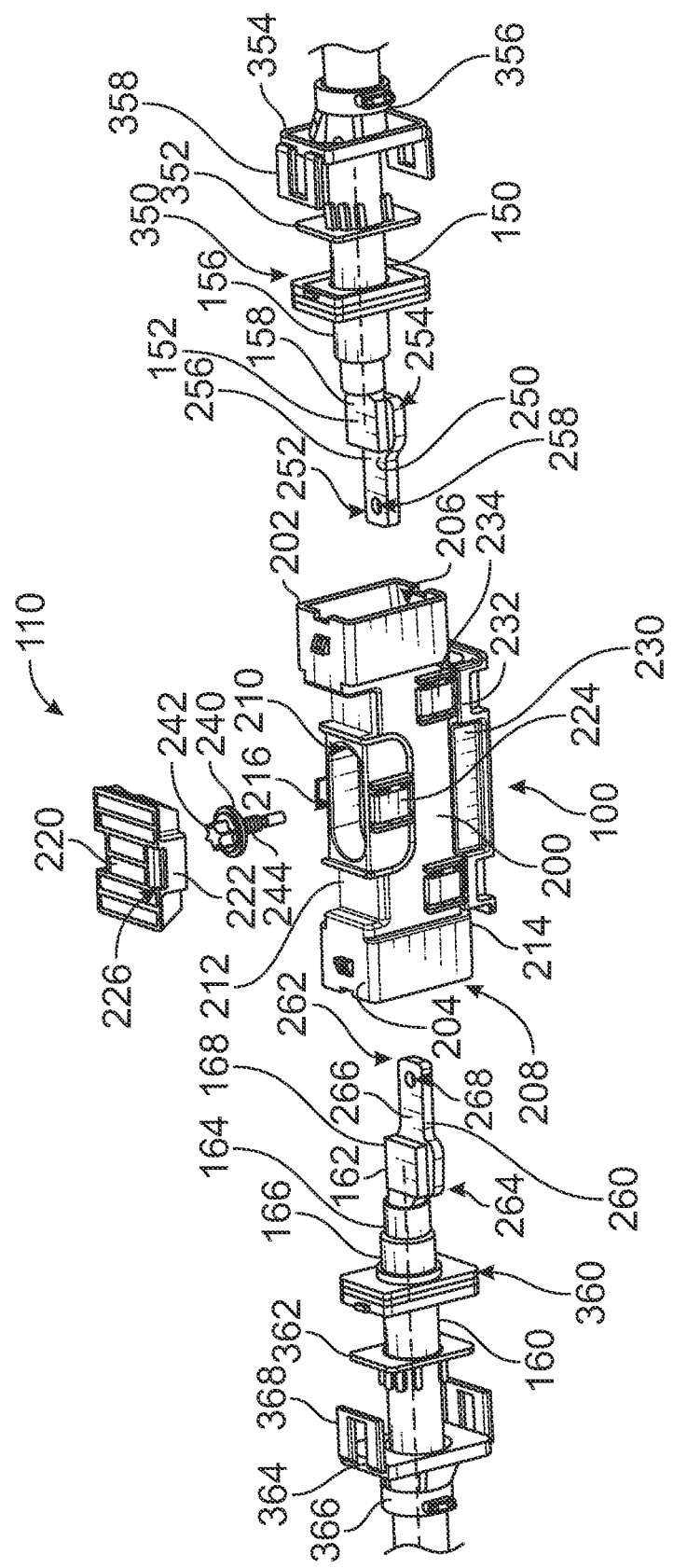
FIG. 4 is an exploded view of the wire harness and the in-line disconnect in accordance with an exemplary embodiment.

FIG. 4 is an exploded view of the wire harness 110 and the in-line disconnect 100 in accordance with an exemplary embodiment. The wire harness 110 includes a first high voltage wire 150 and a second high voltage wire 160. The first and second high voltage wires 150, 160 are configured to be electrically connected to each other through the in-line disconnect 100. In various embodiments, the wire harness 110 may include additional wires 112 in alternative embodiments. For example, additional wires 112 may be arranged in parallel with the first high voltage wire 150 and the second high voltage wire 160. The additional wires 112 may extend into the in-line disconnect 100. Alternatively, additional in-line disconnects 100 may be provided to electrically connect the additional wires 112. In such embodiments, the in-line disconnects 100 may include features to fix the in-line disconnects 100 together, such as clips, latches, fasteners, the ties, and the like for wire management. Optionally, the in-line disconnect(s) 100 may include features to secure the in-line disconnect(s) 100 to other structures of the vehicle. For example, the in-line disconnect(s) 100 may include brackets, latches, clips, fasteners, ties, and the like used to secure to the frame or other structure of the vehicle.

The first high voltage wire 150 includes a first conductor 152. The second high voltage wire 160 includes a second conductor 162. In various embodiments, the conductors 152, 162 may be stranded wires. Insulators 154, 164 may surround the conductors 152, 162, respectively. Wire jackets 156, 166 may surround the insulators 154, 164, respectively. Optionally, cable shields may be provided between the insulators 154, 164 and the wire jackets 156, 166. An end 158 of the first conductor 152 may be exposed and coupled to a corresponding contact of the in-line disconnect 100. An end 168 of the second conductor 162 may be exposed and coupled to a corresponding contact of the in-line disconnect 100. For example, the ends 158, 168 may be welded to the corresponding contacts.

The in-line disconnect 100 includes a housing 200 extending between a first end 202 and a second end 204. In the illustrated embodiment, the first and second ends 202, 204 are on opposite sides of the housing 200. In alternative embodiments, the housing 200 may be a right angle housing where the first end is perpendicular to the second end or at other angles. The housing 200 includes a central cavity 210 that receives components of the in-line disconnect 100. In an exemplary embodiment, the housing 200 includes a first chamber 206 at the first end 202 and a second chamber 208 at the second end 204. The first chamber 206 is open to the central cavity 210 and receives the first high voltage wire 150. The second chamber 208 is open to the central cavity 210 and receives the second high voltage wire 160.

In an exemplary embodiment, the housing 200 includes a top 212 and a bottom 214. The housing 200 includes an opening 216 at the top 212. Optionally, the housing 200 may include an opening (not shown) at the bottom 214. A cover 220 is coupled to the top 210 to close the opening 216. The cover 220 is removable from the housing 200. In an exemplary embodiment, the cover 220 includes a securing feature 222 to secure the cover 220 to the housing 200. In various embodiments, the securing feature 222 is a latch or clip configured to be coupled to a securing feature 224 of the housing 200. In an exemplary embodiment, the cover 220 includes a cover seal 226 configured to be sealingly coupled to the housing 200 to seal the opening 216.

Figure 5:
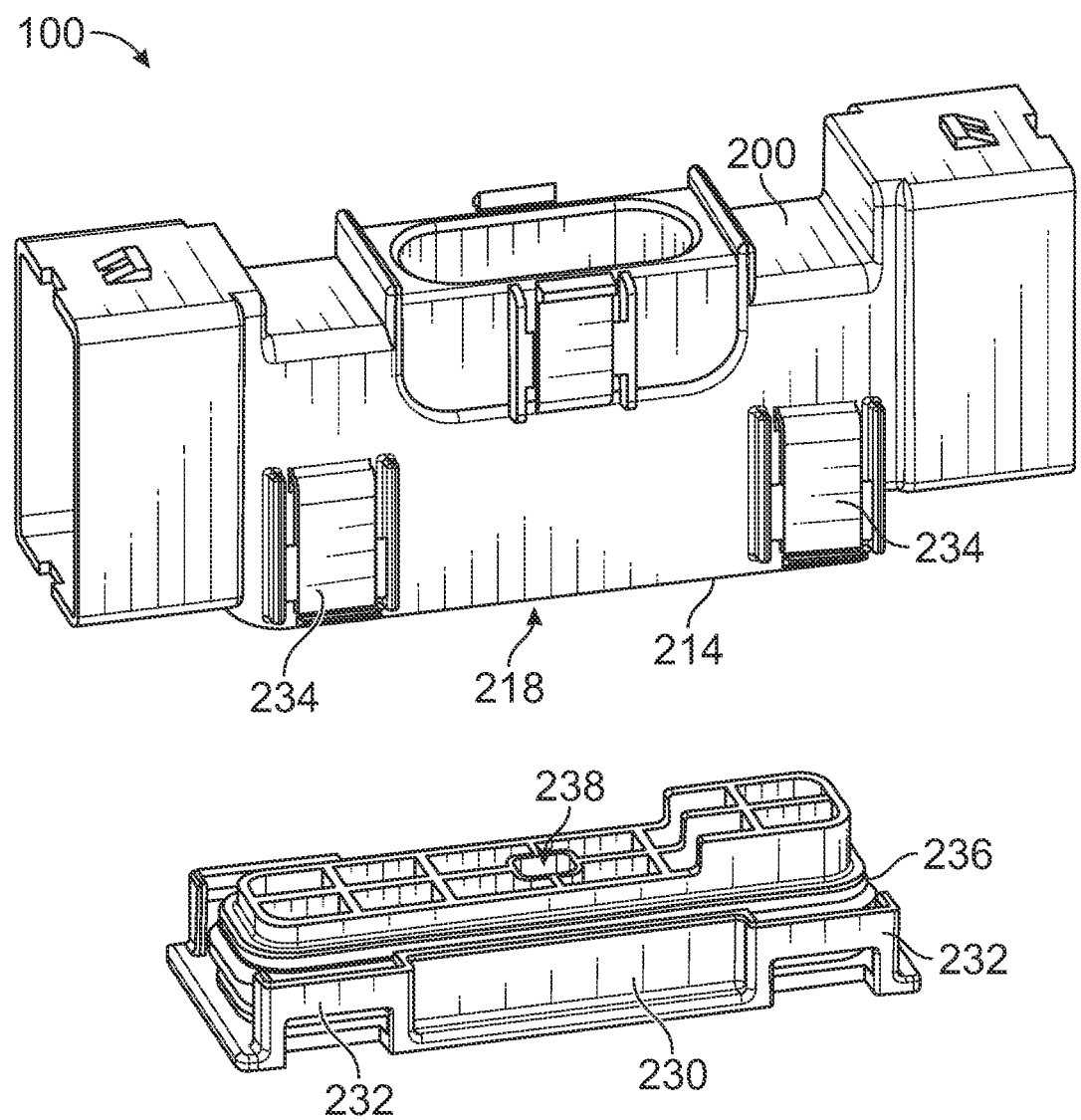
FIG. 5, which is an exploded view of a portion of the in-line disconnect, the in-line disconnect includes a bottom cover coupled to the bottom of the housing in an exemplary embodiment.

With additional reference to FIG. 5, which is an exploded view of a portion of the in-line disconnect 100, the in-line disconnect 100 includes a bottom cover 230 coupled to the bottom 214 of the housing 200. The bottom cover 230 is used to close an opening 218 at the bottom 214. The bottom cover 230 is removable from the housing 200. In an exemplary embodiment, the bottom cover 230 includes a securing feature 232 to secure the bottom cover 230 to the housing 200. In various embodiments, the securing feature 232 is a latch or clip configured to be coupled to a securing feature 234 of the housing 200. In an exemplary embodiment, the bottom cover 230 includes a bottom cover seal 236 configured to be sealingly coupled to the housing 200 to seal the opening 218. In an exemplary embodiment, the bottom cover 230 includes a pocket 238. The pocket 238 may be approximately centered along the bottom cover 230.

With reference back to FIG. 4, the in-line disconnect 100 includes a connecting element 240 configured be received in the central cavity 210. In the illustrated embodiment, the connecting element 240 is a threaded fastener. The connecting element 240 includes a head 242 and a threaded shaft 244 the distal end of the threaded shaft 244 is configured be received in the pocket 238 in the bottom cover 230 when the connecting element 240 is received in the housing 200. The connecting element 240 is used to mechanically and electrically connect the first and second high voltage wires 150, 160. For example, the connecting element 240 is used to mechanically and electrically connect a first disconnect contact 250 and a second disconnect contact 260. The connecting element 240 is configured to be disconnected from the first and second disconnect contacts 250, 260 to allow disconnection and removal of the first high voltage wire 150 and/or the second high voltage wire 160 from the housing 200.

The in-line disconnect 100 includes the first disconnect contact 250 electrically connected to the first high voltage wire 150. The first disconnect contact 250 is manufactured from an electrically conductive material, such as a metal material. For example, the first disconnect contact 250 may be manufactured from copper, aluminum, stainless steel, and the like. In an exemplary embodiment, the first disconnect contact 250 is planar and formed from a metal plate. Optionally, the first disconnect contact 250 may be stamped from a metal plate. The first disconnect contact 250 includes a mating end 252 and a terminating end 254. The first high voltage wire 150 is terminated to the terminating end 254. For example, the first conductor 152 is welded to the terminating end 254. The mating end 252 is configured to be mated with the second disconnect contact 260. In an exemplary embodiment, the first disconnect contact 250 includes a mating tab 256 at the mating end 252. The mating tab 256 includes an opening 258 therethrough. The opening 258 may be threaded. The opening 258 receives the connecting element 240.

The in-line disconnect 100 includes the second disconnect contact 260 electrically connected to the second high voltage wire 160. The second disconnect contact 260 is manufactured from an electrically conductive material, such as a metal material. For example, the second disconnect contact 260 may be manufactured from copper, aluminum, stainless steel, and the like. In an exemplary embodiment, the second disconnect contact 260 is planar and formed from a metal plate. Optionally, the second disconnect contact 260 may be stamped from a metal plate. In an exemplary embodiment, the second disconnect contact 260 is identical to the first disconnect contact 250. However, in alternative embodiments, the second disconnect contact 260 may be sized and/or shaped differently than the first disconnect contact 250. The second disconnect contact 260 includes a mating end 262 and a terminating end 264. The second high voltage wire 160 is terminated to the terminating end 264. For example, the second conductor 162 is welded to the terminating end 264. The mating end 262 is configured to be mated with the mating end 252 of the first disconnect contact 250. In an exemplary embodiment, the second disconnect contact 260 includes a mating tab 266 at the mating end 262. The mating tab 266 includes an opening 268 therethrough. The opening 268 may be threaded. The opening 268 receives the connecting element 240. In an exemplary embodiment, the opening 268 is configured to be aligned with the opening 258 within the central cavity 210 to receive the connecting element 240.

During assembly, the first disconnect contact 250 is terminated to the first conductor 152 of the first high voltage wire 150. The first high voltage wire 150 is loaded into the first chamber 206 of the housing 200. The first disconnect contact 250 is loaded into the central cavity 210 of the housing 200. The first high voltage wire 150 extends from the first end 202 of the housing 200. In an exemplary embodiment, a first wire seal 350 is placed over the end of the first high voltage wire 150. The first wire seal 350 is configured to be sealingly coupled to the wire jacket 156 of the first high voltage wire 150. The first wire seal 350 is configured to be sealingly coupled to the first end 202 of the housing 200. For example, the first wire seal 350 may be loaded into the first chamber 206 to seal against the interior surface of the housing 200. In an exemplary embodiment, a seal support 352 may be placed over the end of the first high voltage wire 150 to provide support for the first wire seal 350. A first wire coupler 354 may be placed over the end of the first high voltage wire 150. The first wire coupler 354 is configured to be coupled to the first end 202 of the housing 200. The first wire coupler 354 includes a ferrule 356 coupled to the first high voltage wire 150. The ferrule 356 may provide strain relief for the first high voltage wire 150 where the first high voltage wire 150 exits the housing 200. The first wire coupler 354 includes one or more securing features 358 used to secure the first wire coupler 354 to the housing 200. For example, the securing features 358 may be latches or clips configured to be coupled to the housing 200. The first wire coupler 354 retains the first wire seal 350 in the first chamber 206 of the housing 200.

During assembly, the second disconnect contact 260 is terminated to the second conductor 162 of the second high voltage wire 160. The second high voltage wire 160 is loaded into the second chamber 206 of the housing 200. The second disconnect contact 260 is loaded into the central cavity 210 of the housing 200. The second high voltage wire 160 extends from the second end 202 of the housing 200. In an exemplary embodiment, a second wire seal 360 is placed over the end of the second high voltage wire 160. The second wire seal 360 is configured to be sealingly coupled to the wire jacket 166 of the second high voltage wire 160. The second wire seal 360 is configured to be sealingly coupled to the second end 202 of the housing 200. For example, the second wire seal 360 may be loaded into the second chamber 206 to seal against the interior surface of the housing 200. In an exemplary embodiment, a seal support 362 may be placed over the end of the second high voltage wire 160 to provide support for the second wire seal 360. A second wire coupler 364 may be placed over the end of the second high voltage wire 160. The second wire coupler 364 is configured to be coupled to the second end 202 of the housing 200. The second wire coupler 364 includes a ferrule 366 coupled to the second high voltage wire 160. The ferrule 366 may provide strain relief for the second high voltage wire 160 where the second high voltage wire 160 exits the housing 200. The second wire coupler 364 includes one or more securing features 368 used to secure the second wire coupler 364 to the housing 200. For example, the securing features 368 may be latches or clips configured to be coupled to the housing 200. The second wire coupler 364 retains the second wire seal 360 in the second chamber 206 of the housing 200.

During assembly, the first and second disconnect contacts 250, 260 are loaded into the central cavity 210 from opposite ends of the housing 200. The first and second disconnect contacts 250, 260 may be oriented parallel to each other and overlap each other in the central cavity 210. The openings 258, 268 are configured to be aligned with each other to receive the threaded shaft 244 of the connecting element 240. The connecting element 240 is tightened to mechanically and electrically connect the mating ends 252, 262 of the first and second disconnect contacts 250, 260. Once assembled, the cover 220 is coupled to the housing 200 to close the central cavity 210. If it becomes necessary to disconnect the wire harness 110, the cover 220 may be removed to access the connecting element 240. The connecting element 240 may be loosened and disconnected from the first and second disconnect contacts 250, 260 to allow one or both of the high voltage wires 150, 260 to be removed from the housing 200.

Figure 6:
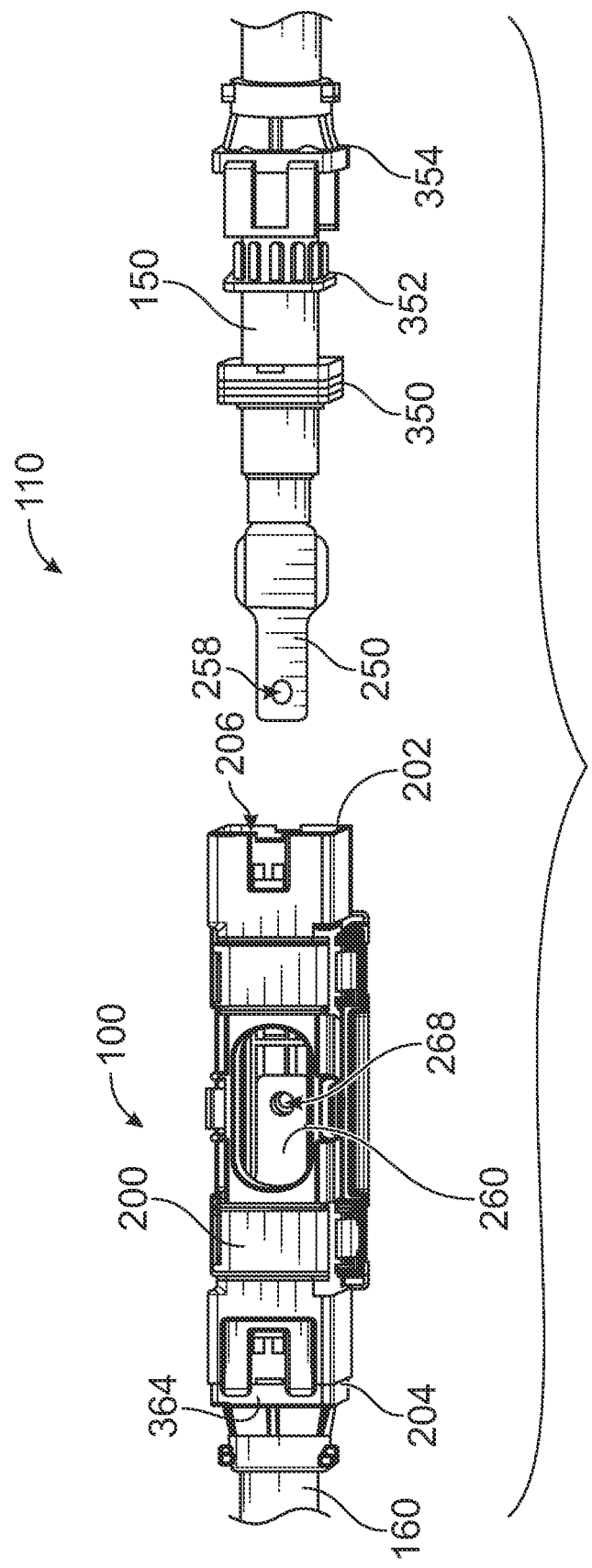
FIG. 6 is a top perspective view of a portion of the wire harness and the in-line disconnect in accordance with an exemplary embodiment.

FIG. 6 is a top perspective view of a portion of the wire harness 110 and the in-line disconnect 100 in accordance with an exemplary embodiment. FIG. 6 illustrates the second high voltage wire 160 coupled to the housing 200 and illustrates the first high voltage wire 150 uncoupled from the housing 200. For example, the first high voltage wire 150 may be in the process of being removed, such as for replacement of the first high voltage wire 150 and/or the charging inlet 116 (shown in FIG. 1). In another example, the first high voltage wire 150 may be in the process of being assembled and loaded into the housing 200. For example, the first disconnect contact 250 and the end of the first high voltage wire 150 may be loaded into the first end 202 of the housing 200. During assembly, the first disconnect contact 250 may be aligned with the second disconnect contact 260 such that the openings 258, 268 are aligned with each other to receive the connecting element 240 (shown in FIG. 4). During assembly, the first wire seal 350 may be coupled to the housing 200 by loading the first wire seal 350 into the first chamber 206 and pressing the seal support 352 and the first wire coupler 354 against the backside of the first wire seal 350 to retain the first wire seal 350 in the housing 200 and close off the first end 202 of the housing 200. The second wire coupler 364 is shown coupled to the second end 204 of the housing 200.

FIG. 7 is a top perspective view of a portion of the wire harness 110 and the in-line disconnect 100 in accordance with an exemplary embodiment. FIG. 7 illustrates the first and second high voltage wires 150, 160 coupled to the housing 200. For example, the first and second wire couplers 354, 364 are coupled to the ends of the housing 200. The first disconnect contact 250 is aligned with the second disconnect contact 260 such that the openings 258, 268 are aligned with each other. The openings 258, 268 are aligned with the pocket 238 and the bottom cover 230.

FIG. 8 is a top perspective view of a portion of the wire harness 110 and the in-line disconnect 100 in accordance with an exemplary embodiment. FIG. 8 illustrates the first and second high voltage wires 150, 160 coupled to the housing 200. FIG. 8 illustrates the connecting element 240 coupled to the first and second disconnect contacts 250, 260. The connecting element 240 mechanically and electrically connects the first and second disconnect contacts 250, 260. The first and second conductors 152, 262 of the first and second high voltage wires 150, 260 are electrically connected through the first and second disconnect contacts 250, 260. Optionally, the connecting element 240 may electrically connect the first and second disconnect contacts 250, 260. Additionally or alternatively, the connecting element 240 may press the bottom side of the first disconnect contact 250 into direct electrical contact with the upper surface of the second disconnect contact 260 to create a direct electrical path between the first and second disconnect contacts 250, 260. Other types of connecting elements may be used in alternative embodiments to mechanically and electrically connect the first and second disconnect contacts 250, 260. In other various embodiments, rather than having the two plate-like contacts, the first and second disconnect contacts 250, 260 may include a pin contact and a socket contact, respectively.

Figure 9:
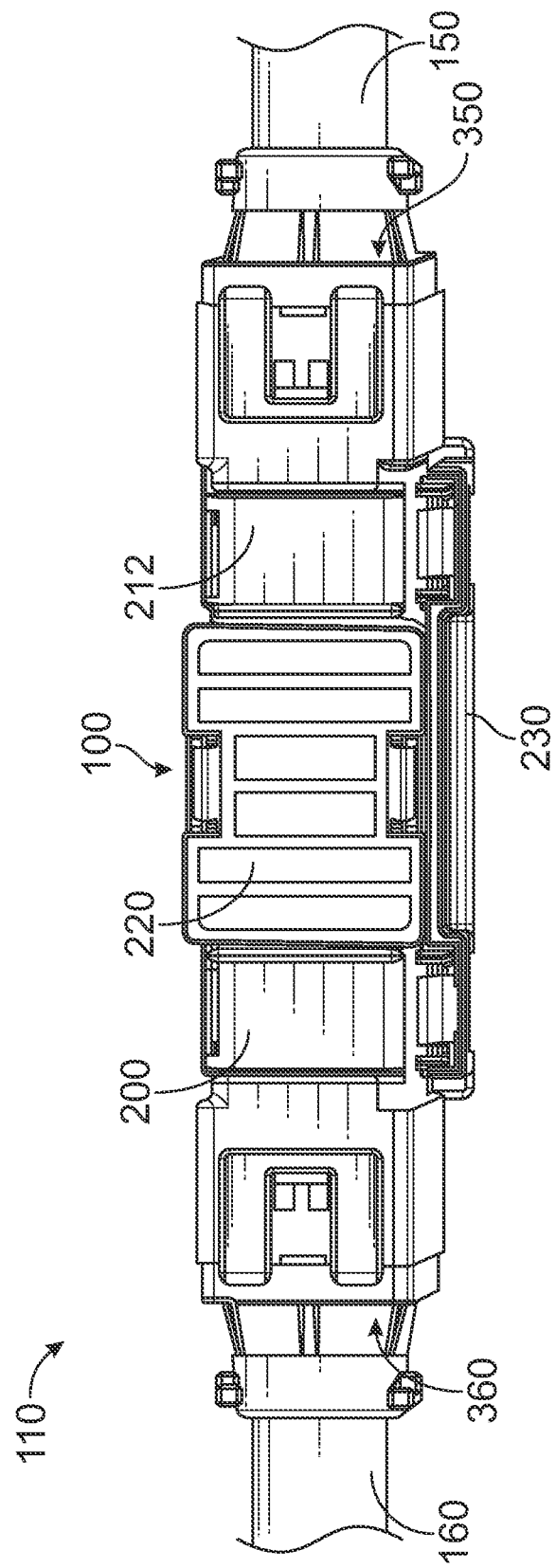
FIG. 9 is a top perspective view of a portion of the wire harness and the in-line disconnect in accordance with an exemplary embodiment

FIG. 9 is a top perspective view of a portion of the wire harness 110 and the in-line disconnect 100 in accordance with an exemplary embodiment. FIG. 9 illustrates the cover 220 coupled to the top 212 of the housing 200 to close the opening 216. The in-line disconnect 100 forms a sealed enclosure around the first and second disconnect contacts 250, 260 (shown in FIG. 8). The cover 220 is sealed to the housing 200. The bottom cover 230 is sealed to the housing 200. The wire seals 350, 360 are sealed to the first and second high voltage wires 150, 160 and sealed to the housing 200.

Figure 10:
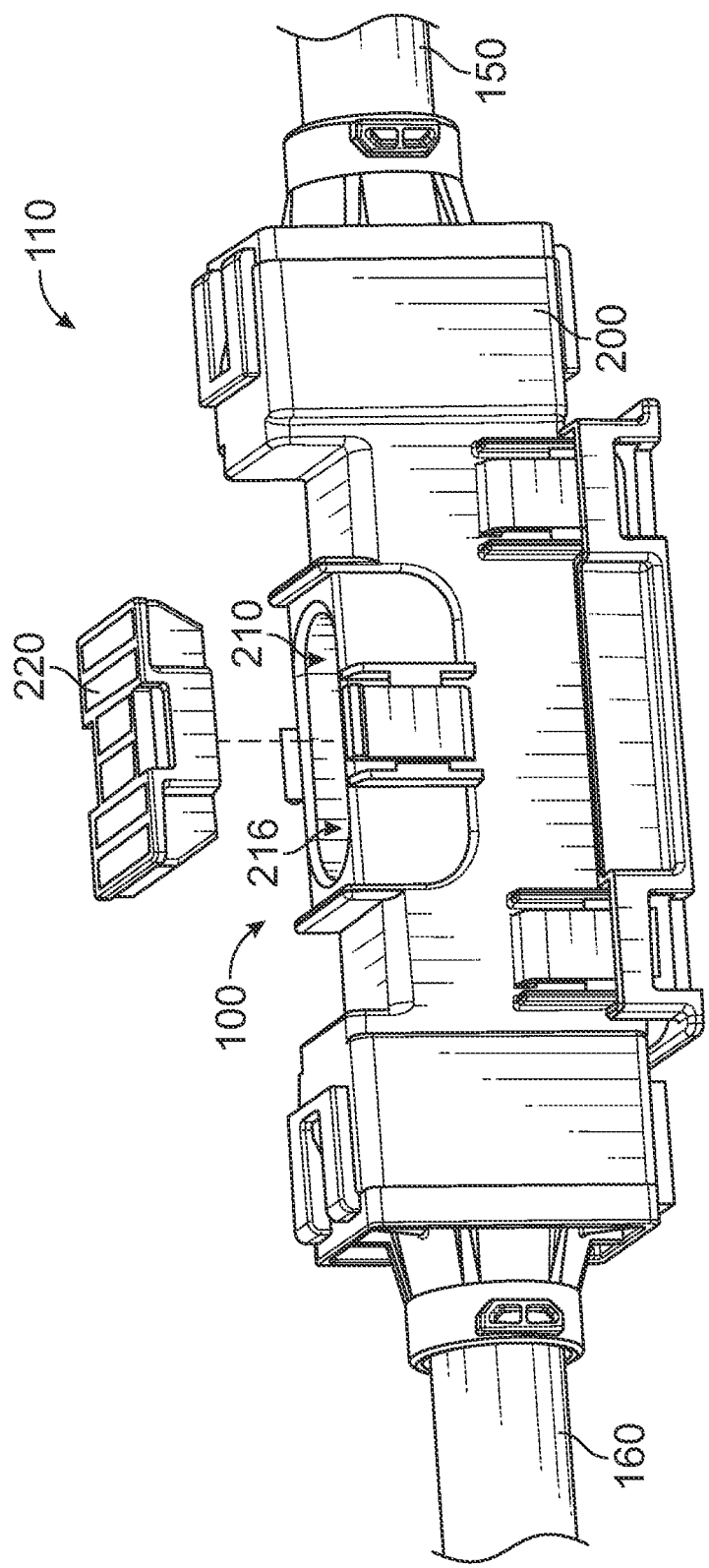
FIG. 10 is a perspective view of a portion of the wire harness and the in-line disconnect in accordance with an exemplary embodiment.

FIG. 10 is a perspective view of a portion of the wire harness 110 and the in-line disconnect 100 in accordance with an exemplary embodiment. FIG. 10 illustrates the cover 220 removed from the housing 200, which provides access to the central cavity 210. For example, the connecting element 240 (shown in FIG. 8) may be accessed through the opening 216 for disconnection and removal. When the connecting element 240 is disconnected from the first and second disconnect contacts 250, 260 (both shown in FIG. 8), one or both of the high voltage wires 150, 160 may be removed from the housing 200, such as for repair or replacement of one or more components of the system.

Figure 11:
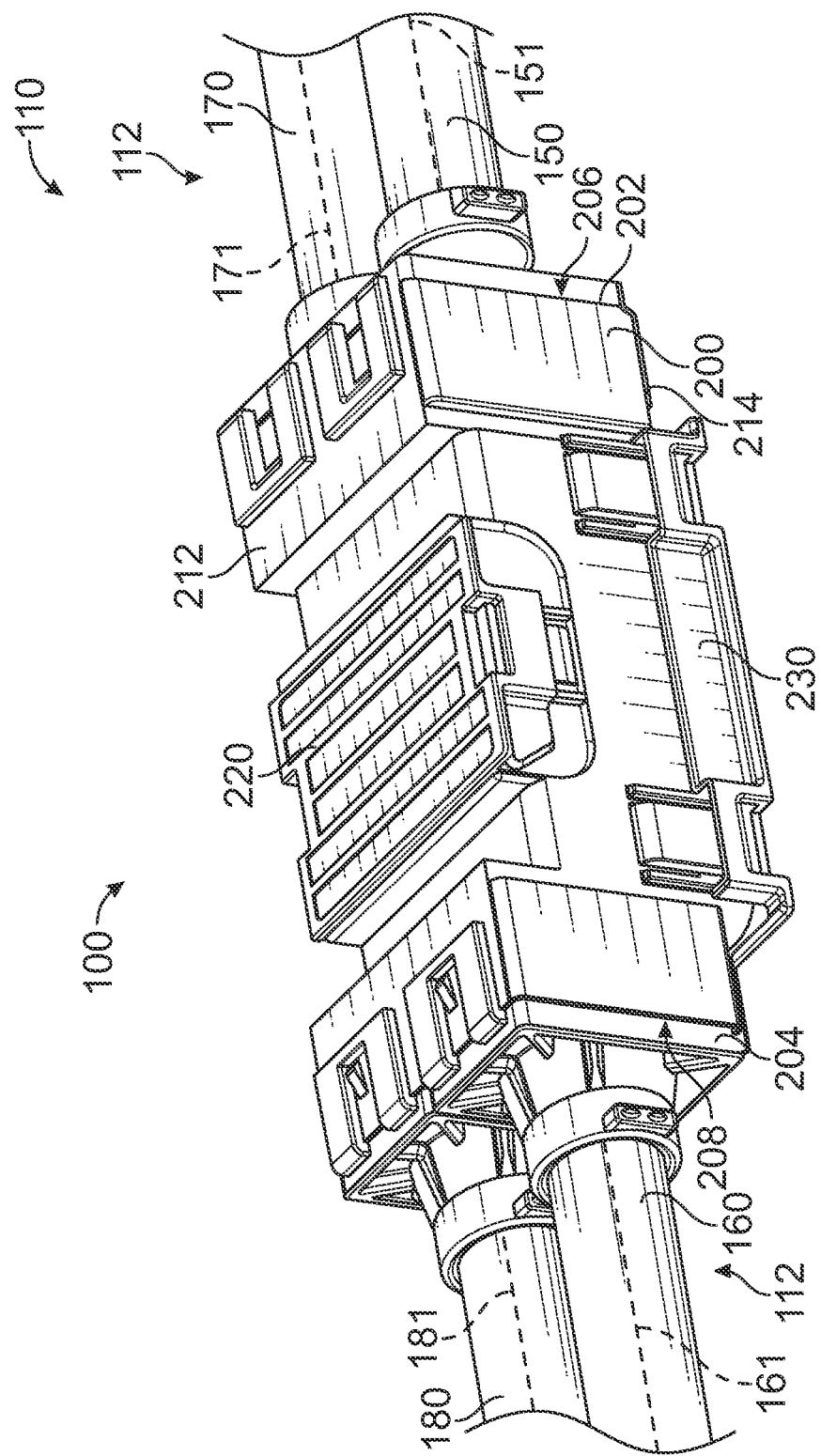
FIG. 11 is a top perspective view of a portion of the wire harness and the in-line disconnect in accordance with an exemplary embodiment.
Figure 12:
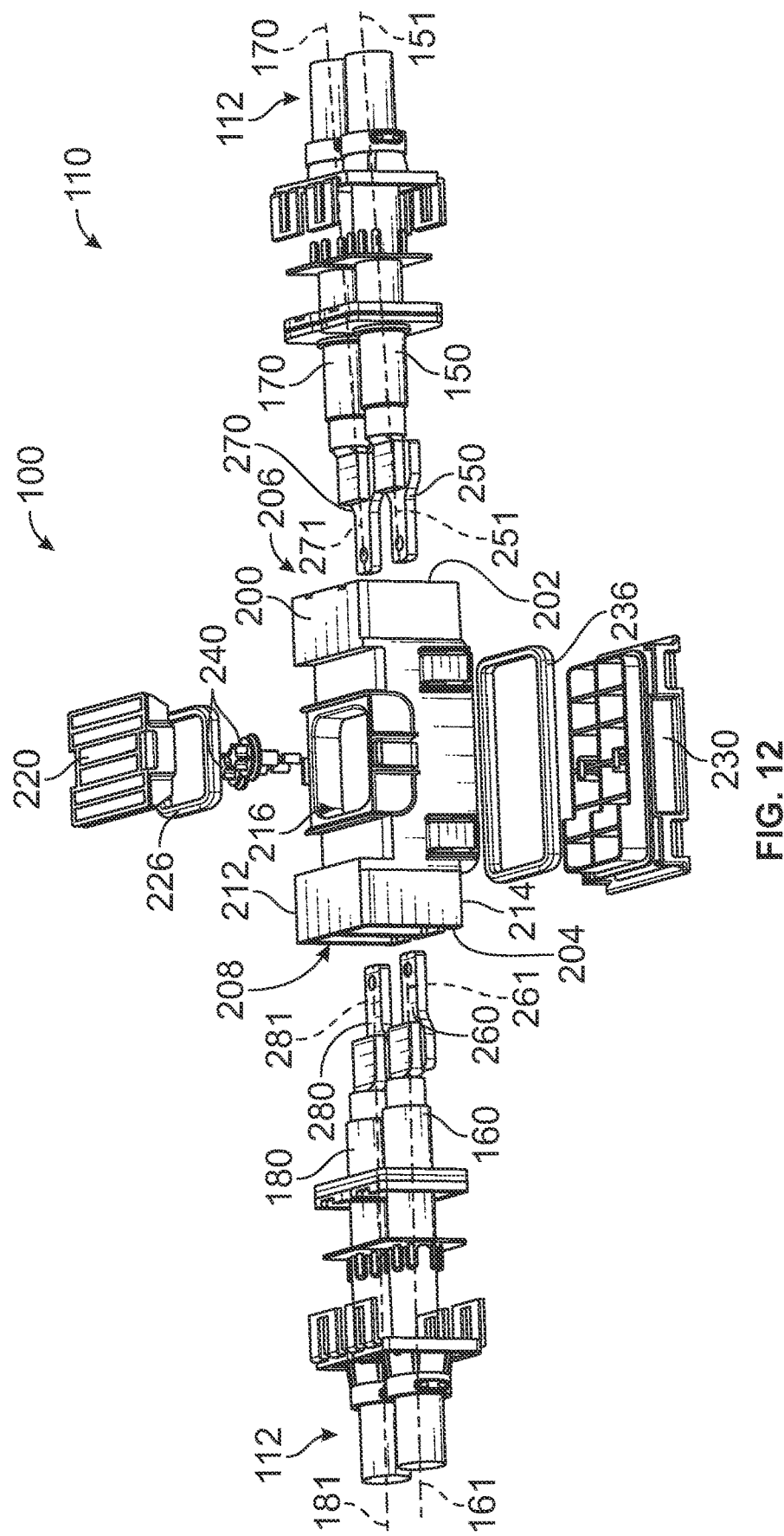
FIG. 12 is an exploded view of the wire harness and the in-line disconnect shown in FIG. 11 in an exemplary embodiment.

FIG. 11 is a top perspective view of a portion of the wire harness 110 and the in-line disconnect 100 in accordance with an exemplary embodiment. FIG. 12 is an exploded view of the wire harness 110 and the in-line disconnect 100 shown in FIG. 11. FIGS. 11 and 12 illustrate the in-line disconnect 100 as a dual in-line disconnect four pairs of the wires 112. For example, the first and second high voltage wires 150, 160 are electrically connected through the in-line disconnect 100 and a second pair of the wires 112, namely a third high-voltage wire 170 and a fourth high voltage wire 180 are electrically connected through the in-line disconnect 100. The cover 220 is removable from the housing 200 to provide access to the connection for both pairs of the wires 112. Alternatively, separate covers 220 may be provided to provide access to the corresponding connections.

As shown in FIG. 12, the first and third high voltage wires 150, 170 are arranged in a pair and the second and fourth high voltage wires 160, 180 are arranged in a pair. The first and second high voltage wires 150, 160 are aligned at the opposite ends 202, 204 of the housing 200 and configured to be electrically connected to each other through the in-line disconnect 100 and the third and fourth high voltage wires 170, 180 are aligned at opposite ends 202, 204 of the housing 200 and configured to be electrically connected to each other through the in-line disconnect 100. The wires 150, 160, 170, 180 are configured to be loaded into the central cavity 210 of the housing 200, such as through the first and second chambers 206, 208. The cover 220 is coupled to the top 212 to close the opening 216 and sealed to the housing 200 using the cover seal 226. The bottom cover 230 is configured to be coupled to the bottom 212 of the housing 200 and is sealed to the housing 200 using the bottom cover seal 236.

The first high-voltage wire 150 extend along a first wire axis 151. The second high-voltage wire 160 extends along a second wire axis 161. The third high-voltage wire 170 extends along a third wire axis 171. The fourth high-voltage wire 180 extends along a fourth wire axis 181. In various embodiments, the first and second wire axes 151, 161 are parallel to each other. For example, the first and second wire axes 151, 161 may be coincident. The third and fourth wire axes 171, 181 are parallel to each other. For example, the third and fourth wire axes 171, 181 are coincident. The wires 112 may be at other orientations in alternative embodiments.

As further shown in FIG. 12, the first and second disconnect contacts 250, 260 are terminated to the first and second high voltage wires 150, 160. Additionally, a third disconnect contact 270 is terminated to the end of the third high voltage wire 170 and a fourth disconnect contact 280 is terminated to the end of the fourth high voltage wire 180. The connecting elements 240 are used to connect and disconnect the disconnect contacts 250, 260 and 270, 280 for electrical connection and electrical disconnection. When disconnected, the high voltage wire 150, 160 and/or 170, 180 may be removed from the housing 200.

In an exemplary embodiment, the disconnect contacts 250, 260, 270, 280 are oriented parallel to each other. The first disconnect contact 250 extends along a first mating axis 251. The second disconnect contact 260 extends along a second mating axis 261. The third disconnect contact 270 extends along a mating axis 271. The fourth disconnect contact 280 extends along a fourth mating axis 281. In the illustrated embodiment, the first and third mating axes 251, 271 are oriented parallel to each other; however, the first and third mating axes 251, 271 may be oriented nonparallel to each other in alternative embodiments. In the illustrated embodiment, the second and fourth mating axes 261, 281 are oriented parallel to each other; however, the second and fourth mating axes 261, 281 may be oriented nonparallel to each other in alternative embodiments. In the illustrated embodiment, the first mating axis 251 is oriented parallel to the second mating axis 261 and the third mating axis 271 is oriented parallel to the fourth mating axis 281. However, other orientations are possible in alternative embodiments.

Figure 13:
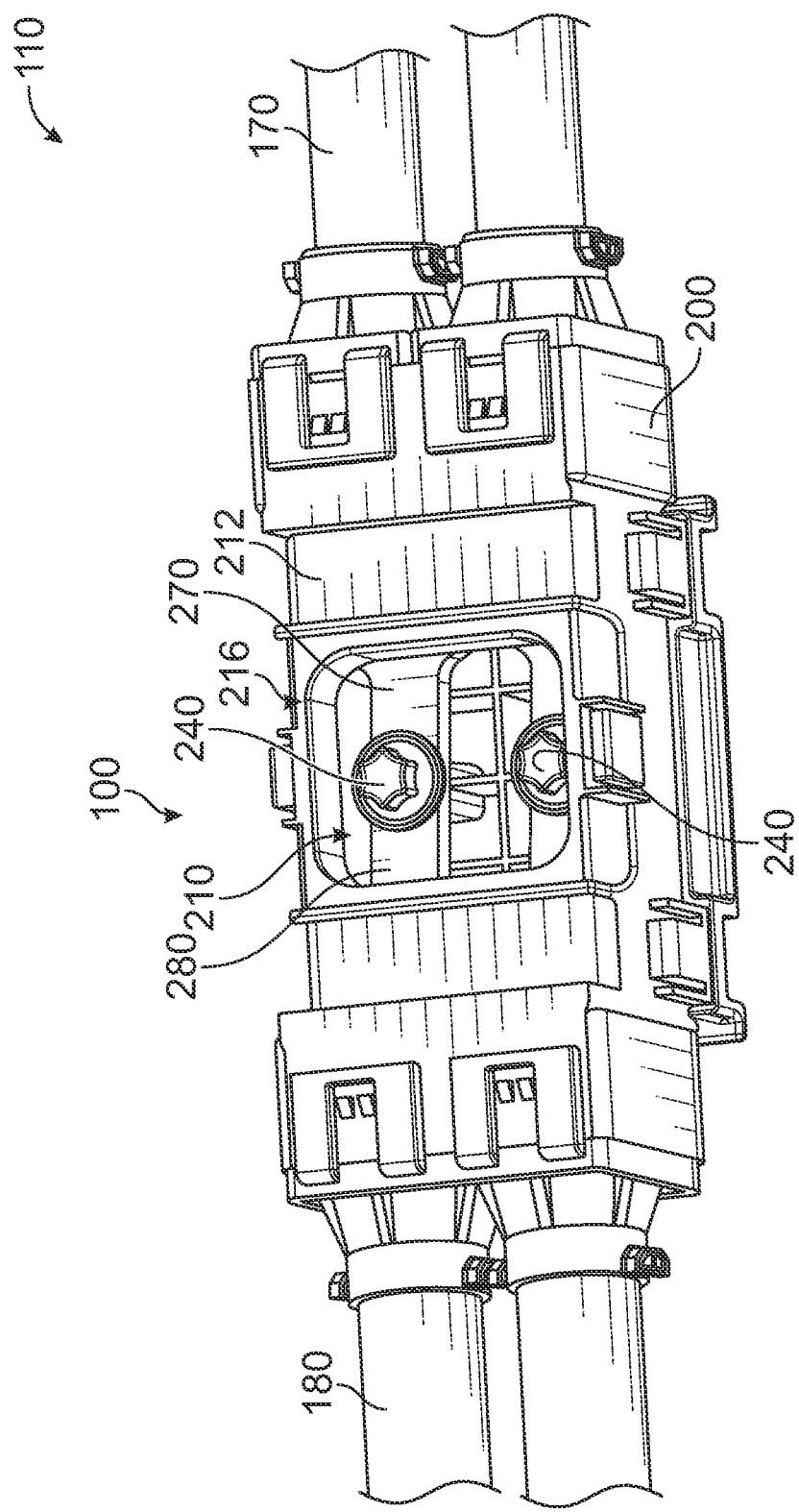
FIG. 13 is a top perspective view of a portion of the wire harness and the in-line disconnect shown in FIG. 11 an exemplary embodiment.

FIG. 13 is a top perspective view of a portion of the wire harness 110 and the in-line disconnect 100 shown in FIG. 11. The cover 220 (shown in FIG. 11) is removed to illustrate the central cavity 210. The connecting elements 240 are accessible through the opening 216 at the top 212 of the housing 200. In an exemplary embodiment, the wire harness 110 includes a third disconnect contact 270 terminated to the third high-voltage wire 170 and a fourth disconnect contact 280 terminated to the fourth high-voltage wire 180. The third and fourth disconnect contacts 270, 280 are mechanically and electrically connected through one of the connecting elements 240. The connecting elements 240 may be disconnected from the third and fourth disconnect contacts 270, 280 to allow disconnection of the disconnect contacts 270, 280 and removal of the third high-voltage wire 170 and/or the fourth high-voltage wire 180 from the housing 200.

Figure 14:
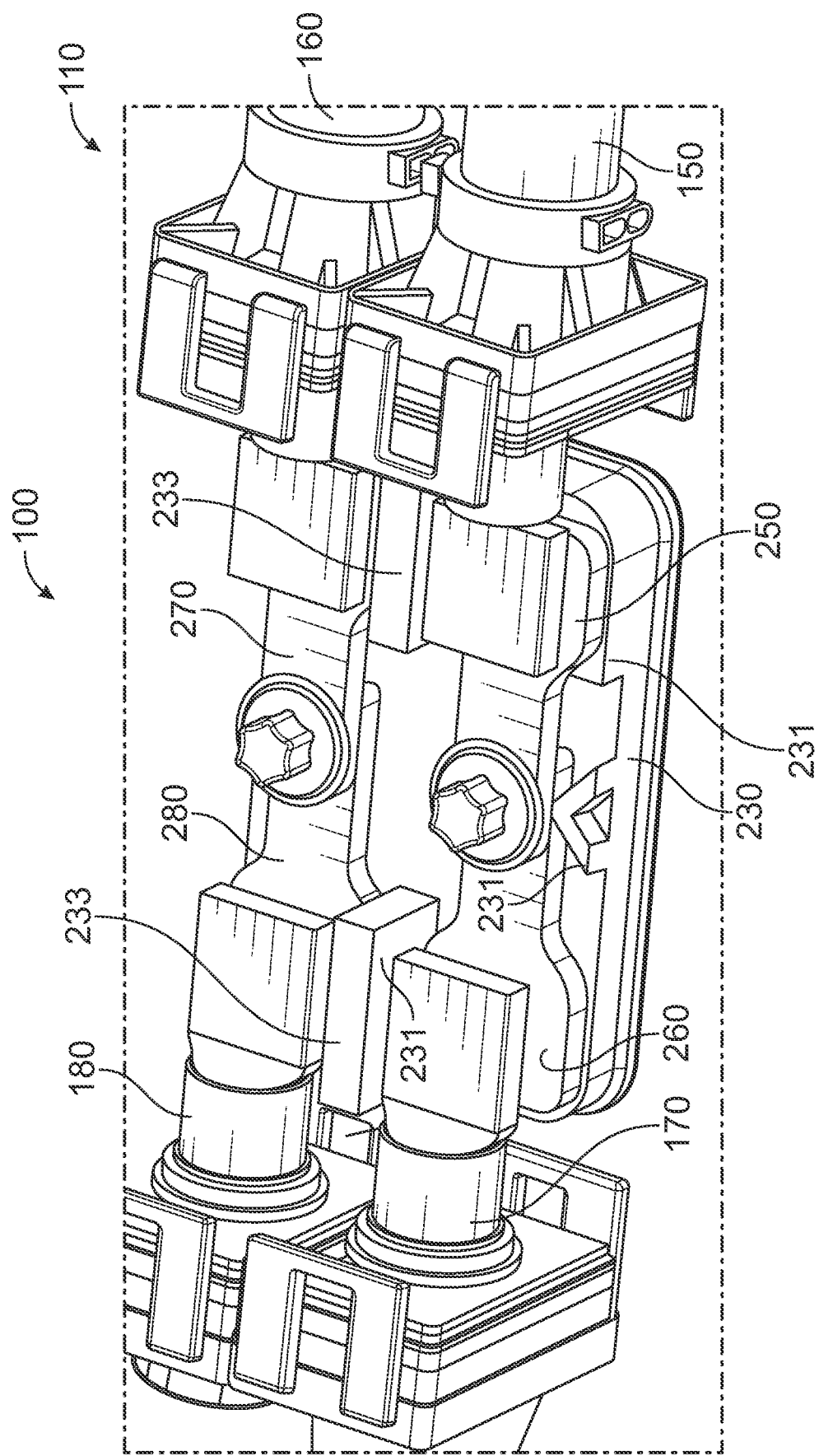
FIG. 14 is a top perspective view of a portion of the wire harness and the in-line disconnect shown in FIG. 11 in an exemplary embodiment

FIG. 14 is a top perspective view of a portion of the wire harness 110 and the in-line disconnect 100 shown in FIG. 11. The housing 200 (shown in FIG. 11) is removed for clarity to illustrate the high voltage wires 150, 160, 170, 180 and the disconnect contacts 250, 260, 270, 280. In an exemplary embodiment, the bottom cover 230 is used to support the disconnect contacts 250, 260, 270, 280. The bottom cover 230 includes support features 231 to support the disconnect contacts 250, 260, 270, 280 relative to the bottom cover 230. The support features 231 may be used to orient the disconnect contacts 250, 260, 270, 280 relative to each other. In an exemplary embodiment, the bottom cover 230 includes separating walls 233 separating the first pair from the second pair. The separating walls 233 may provide electrical isolation between the pairs.

Figure 15:
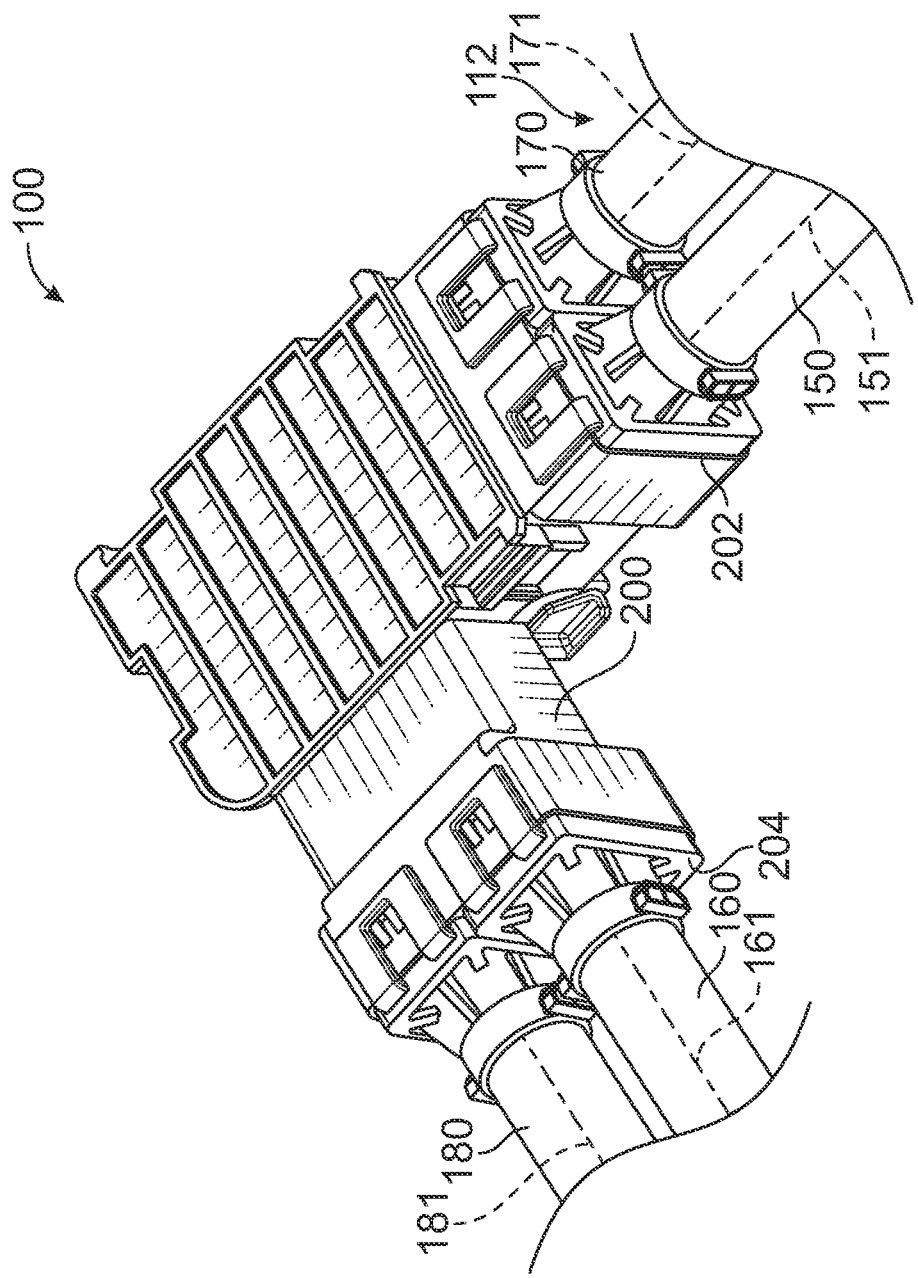
FIG. 15 is a top perspective view of a portion of the wire harness and the in-line disconnect in accordance with an exemplary embodiment.

FIG. 15 is a top perspective view of a portion of the wire harness 110 and the in-line disconnect 100 in accordance with an exemplary embodiment. In the illustrated embodiment, the housing 200 of the in-line disconnect 100 is a right angle housing with the first end 202 oriented perpendicular to the second end 204. The first end 202 may be oriented at other angles relative to the second end 204, such as at 25°, 45°, 60° or other angles depending on the particular application. The first high-voltage wire 150 extend along the first wire axis 151. The second high-voltage wire 160 extends along the second wire axis 161. The third high-voltage wire 170 extends along the third wire axis 171. The fourth high-voltage wire 180 extends along the fourth wire axis 181. The first and second wire axes 151, 161 are nonparallel to each other. For example, the first and second wire axes 151, 161 are oriented perpendicular to each other. The third and fourth wire axes 171, 181 are nonparallel to each other. For example, the third and fourth wire axes 171, 181 are oriented perpendicular to each other. The wires 112 may be at other orientations in alternative embodiments. The in-line disconnect 100 allows routing of the wires 112 at particular angular orientations for routing the electrical paths through the vehicle. In an exemplary embodiment, the in-line disconnect 100 allows angling of the wires 112 in very tight for small spaces, such as spaces tighter than the minimum bend radius for the wires 112 would allow.

Figure 16:
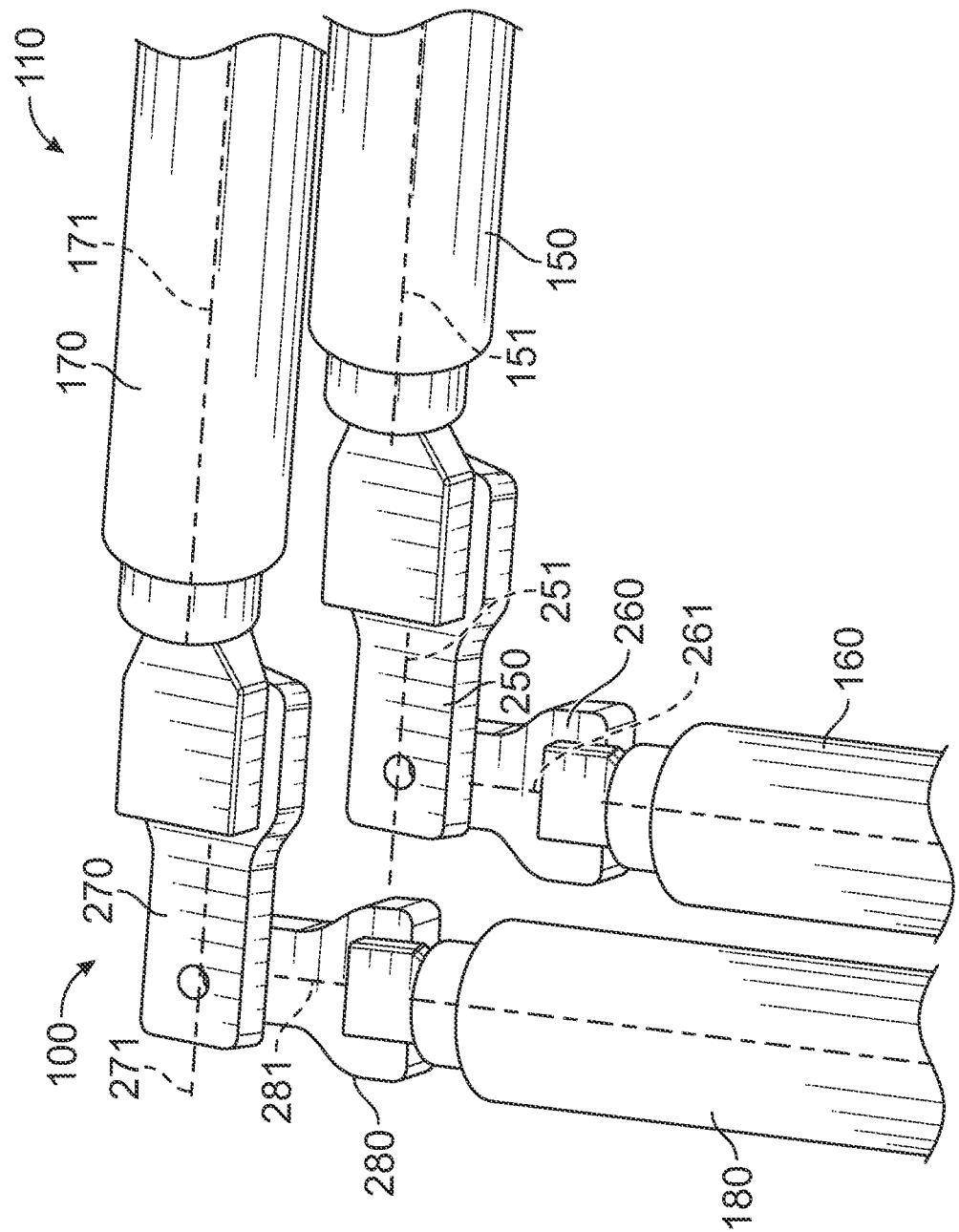
FIG. 16 is a top perspective view of a portion of the wire harness and the in-line disconnect shown in FIG. 15 in an exemplary embodiment.

FIG. 16 is a top perspective view of a portion of the wire harness 110 and the in-line disconnect 100 shown in FIG. 15. The housing 200 (shown in FIG. 15) is removed for clarity to illustrate the high voltage wires 150, 160, 170, 180 and the disconnect contacts 250, 260, 270, 280. In an exemplary embodiment, the first and third disconnect contacts 250, 270 are oriented nonparallel to the second and fourth disconnect contacts 260, 280. For example, the first and third disconnect contacts 250, 270 may be oriented perpendicular to the second and fourth disconnect contacts 260, 280. The first disconnect contact 250 extends along the first mating axis 251. The second disconnect contact 260 extends along the second mating axis 261. The third disconnect contact 270 extends along the mating axis 271. The fourth disconnect contact 280 extends along the fourth mating axis 281. In the illustrated embodiment, the first and third mating axes 251, 271 are oriented parallel to each other; however, the first and third mating axes 251, 271 may be oriented nonparallel to each other in alternative embodiments. In the illustrated embodiment, the second and fourth mating axes 261, 281 are oriented parallel to each other; however, the second and fourth mating axes 261, 281 may be oriented nonparallel to each other in alternative embodiments. In the illustrated embodiment, the first mating axis 251 is oriented perpendicular to the second mating axis 261 and the third mating axis 271 is oriented perpendicular to the fourth mating axis 281. However, other orientations are possible in alternative embodiments.

In various embodiments, the third and fourth disconnect contacts 270, 280 may be longer than the first and second disconnect contacts 250, 260 to form the right angle connection. In other various embodiments, the third and fourth high-voltage wires 170, 180 may be loaded further into the housing 200 than the first and second high-voltage wires 150, 160 to form the right angle connection.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A wire harness for a charging inlet of a vehicle, the wire harness comprising:
   a first high voltage wire having a first conductor;
   a second high voltage wire having a second conductor; and
   an inline disconnect configured to electrically connect the first and second conductors and configured to allow the first and second conductors to be disconnected from each other, the inline disconnect comprising:
   a housing having a central cavity, the housing having a first end and a second end, the housing having a first chamber open to the central cavity at the first end, the first chamber receiving the first high voltage wire, the housing having a second chamber open to the central cavity at the second end, the second chamber receiving the second high voltage wire;
   a first disconnect contact terminated to an end of the first conductor, the first disconnect contact received in the central cavity;
   a second disconnect contact terminated to an end of the second conductor, the second disconnect contact received in the central cavity; and
   a connecting element coupling the first and second disconnect contacts, the connecting element being removable from at least one of the first disconnect contact or the second disconnect contact to allow disconnection of the first and second disconnect contacts to electrically separate the first and second high voltage wires.

2. The wire harness of claim 1, wherein the first high voltage wire is electrically connected to a charging terminal of the charging inlet, the second high voltage wire being electrically connected to a battery of the vehicle, the charging inlet being electrically connected to the battery through the in-line disconnect when the first and second disconnect contacts are connected, the charging inlet being disconnected from the battery when the first and second disconnect contacts are disconnected.

3. The wire harness of claim 1, wherein the connecting element is threadably coupled to at least one of the first disconnect contact and the second disconnect contact.

4. The wire harness of claim 1, wherein the connecting element is received in the central cavity to connect the first and second disconnect contacts.

5. The wire harness of claim 1, wherein the in-line disconnect includes a first wire seal sealingly coupled to the first high voltage wire and sealingly coupled to the housing at the first end, and the in-line disconnect includes a second wire seal sealingly coupled to the second high voltage wire and sealingly coupled to the housing at the second end.

6. The wire harness of claim 1, wherein the first high voltage wire exits the housing along a first wire axis, the second high voltage wire exits the housing along a second wire axis parallel to the first wire axis.

7. The wire harness of claim 1, wherein the housing is a right-angle housing having the first end oriented perpendicular to the second end, the first high voltage wire exiting the housing along a first wire axis, the second high voltage wire exiting the housing along a second wire axis perpendicular to the first wire axis.

8. The wire harness of claim 1, wherein the first disconnect contact includes a first terminating end and a first mating tab at a first mating end of the first disconnect contact, the first terminating end being terminated to the end of the first conductor, the second disconnect contact including a second terminating end and a second mating tab at a second mating end of the second disconnect contact, the second terminating end being terminated to the end of the second conductor, the connecting element mechanically and electrically connecting the first and second mating tabs of the first and second disconnect contacts.

9. The wire harness of claim 8, wherein the first mating tab includes a first opening and the second mating tab includes a second opening, the connecting element being threadably coupled to the first and second mating tabs at the first and second openings.

10. The wire harness of claim 1, wherein the in-line disconnect includes a cover removably coupled to the housing, the cover being removable to provide access to the central cavity.

11. The wire harness of claim 10, wherein the cover includes a cover seal sealingly coupled to the housing.

12. The wire harness of claim 1, wherein the in-line disconnect further comprises:
a third disconnect contact terminated to an end of a third conductor of a third high voltage wire, the third disconnect contact being received in the central cavity of the housing;
a fourth disconnect contact terminated to an end of a fourth conductor of a fourth high voltage wire, the fourth disconnect contact being received in the central cavity of the housing; and
a second connecting element coupling the third and fourth disconnect contacts, the second connecting element being removable from at least one of the third disconnect contact or the fourth disconnect contact to allow disconnection of the third and fourth disconnect contacts to electrically separate the third and fourth high voltage wires.

13. The wire harness of claim 12, wherein the first and second disconnect contacts extend along a first mating axis and the third and fourth disconnect contacts extend along a second mating axis parallel to the first mating axis.

14. A wire harness for a charging inlet of a vehicle, the wire harness comprising:
a high voltage wire extending between a first end and a second end, the high voltage wire having a conductor;
a charging terminal including a charging pin and a terminating end opposite the charging pin, the charging pin configured to be electrically connected to a charging device, the terminating end terminated to the first end of the high voltage wire, the charging terminal configured to be loaded into a charging inlet housing of the charging inlet;
a disconnect contact including a terminating end and a mating tab at a mating end, the terminating end of the disconnect contact being terminated to the conductor at the second end of the high voltage wire, the mating tab having a separable mating interface configured to interface with a mating disconnect contact associated with a high voltage battery wire electrically connected to a battery of the vehicle.

15. The wire harness of claim 14, wherein the high voltage wire is a first high voltage wire, the charging terminal is a first charging terminal, and the disconnect contact is a first disconnect contact, the wire harness further comprising:
a second high voltage wire extending between a first end and a second end, the second high voltage wire having a second conductor;
a second charging terminal including a second charging pin and a second terminating end opposite the second charging pin, the second charging pin configured to be electrically connected to the charging device, the second terminating end terminated to the first end of the second high voltage wire, the second charging terminal configured to be loaded into the charging inlet housing of the charging inlet;
a second disconnect contact including a second terminating end and a second mating tab at a second mating end, the second terminating end of the second disconnect contact being terminated to the second conductor at the second end of the second high voltage wire, the second mating tab having a separable mating interface configured to interface with a second mating disconnect contact associated with a second high voltage battery wire electrically connected to the battery of the vehicle.

16. The wire harness of claim 14, wherein the high voltage wire includes a wire coupler at the first end, the wire coupler including a wire seal sealed to the high voltage wire, the wire coupler including a securing feature configured to be mechanically secured to the charging inlet housing.

17. The wire harness of claim 14, further comprising an inline disconnect configured to electrically connect the conductor of the high voltage wire with a conductor of the high voltage battery wire and configured to allow the conductor of the high voltage wire to be disconnected from the conductor of the high voltage battery wire, the inline disconnect comprising:
a housing having a central cavity, the housing having a first end and a second end, the housing having a first chamber open to the central cavity at the first end, the first chamber receiving the high voltage wire, the housing having a second chamber open to the central cavity at the second end, the second chamber configured to receive the battery high voltage wire, the disconnect contact being received in the central cavity, the central cavity configured to receive a second disconnect contact terminated to an end of the conductor of the high voltage battery wire; and
a connecting element configured to couple the disconnect contact and the second disconnect contact, the connecting element being removable from the disconnect contact to allow disconnection of the disconnect contact from the second disconnect contact to electrically separate the high voltage wire from the high voltage battery wire.

18. A charging inlet for charging a battery of a vehicle, the charging inlet comprising:
- a charging inlet housing including a terminal channel at a front of the charging inlet housing configured to receive a charging device, the charging inlet housing including a rear chamber at a rear of the charging inlet housing;
- a charging terminal received in the charging inlet housing, the charging terminal including a charging pin extending into the terminal channel to mate with the charging device, the charging terminal including a terminating end in the rear chamber; and
- a wire harness coupled to the charging terminal, the wire harness including a high voltage wire extending between a first end and a second end, the high voltage wire having a conductor, the conductor terminated to the terminating end of the charging terminal at the first end, the wire harness including a disconnect contact including a terminating end and a mating tab at a mating end, the terminating end of the disconnect contact being terminated to the conductor at the second end of the high voltage wire, the mating tab having a separable mating interface configured to interface with a mating disconnect contact associated with a high voltage battery wire electrically connected to a battery of the vehicle.

19. The charging inlet of claim 18, further comprising an inline disconnect configured to electrically connect the conductor of the high voltage wire with a conductor of the high voltage battery wire and configured to allow the conductor of the high voltage to be disconnected from the conductor of the high voltage battery wire, the inline disconnect comprising:
- a housing having a central cavity, the housing having a first end and a second end, the housing having a first chamber open to the central cavity at the first end, the first chamber receiving the high voltage wire, the housing having a second chamber open to the central cavity at the second end, the second chamber configured to receive the battery high voltage wire, the disconnect contact being received in the central cavity, the central cavity configured to receive a second disconnect contact terminated to an end of the conductor of the high voltage battery wire; and
- a connecting element configured to couple the disconnect contact and the second disconnect contact, the connecting element being removable from the disconnect contact to allow disconnection of the disconnect contact from the second disconnect contact to electrically separate the high voltage wire from the high voltage battery wire.

20. The charging inlet of claim 19, wherein the inline disconnect includes a first wire seal sealingly coupled to the high voltage wire and sealing coupled to the housing at the first end, the inline disconnect including a cover removably coupled to the housing, the cover being removable to provide access to the central cavity, the cover including a cover seal sealingly coupled to the housing.

* * * * *